US012591924B2

(12) United States Patent　　(10) Patent No.: US 12,591,924 B2

Satake et al.　　(45) Date of Patent: Mar. 31, 2026

(54) INFORMATION PROCESSING DEVICE, INFORMATION PROCESSING METHOD, AND SYSTEM

(71) Applicant: TOYOTA JIDOSHA KABUSHIKI KAISHA, Aichi-ken (JP)

(72) Inventors: Kentaro Satake, Nagoya (JP); Mami Mori, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 218 days.

(21) Appl. No.: 18/353,891

(22) Filed: Jul. 18, 2023

(65) Prior Publication Data

US 2024/0112255 A1　　Apr. 4, 2024

(30) Foreign Application Priority Data

Sep. 30, 2022　　(JP) ................................. 2022-157524

(51) Int. Cl.
G06Q 30/0645 (2023.01)

(52) U.S. Cl.
CPC ................................ G06Q 30/0645 (2013.01)

(58) Field of Classification Search
CPC .................................................. G06Q 30/0645
See application file for complete search history.

(56) References Cited

U.S. PATENT DOCUMENTS 10,354,230 B1 *　7/2019　Hanson .................. G07B 15/00
2020/0378771 A1 *　12/2020　Beaurepaire ....... G06Q 30/0284
2023/0214936 A1 *　7/2023　Larson .................. G06Q 10/20
705/4

FOREIGN PATENT DOCUMENTS

JP　　2008152496 A　　7/2008
JP　　2021-039593 A　　3/2021

OTHER PUBLICATIONS

Adli H. Al-Balbissi, Unique Accident Trend of Rental Cars, 2001, abstract (Year: 2001).*
KINTO Corporation, "Contract Plan, Subscription of the [KINTO] car, from Toyota", Jun. 17, 2022, https://web.archive.org/web/20220617200651/https://kintojp.com/select_plan/, 15pp.

* cited by examiner

*Primary Examiner* — Ibrahim N El-Bathy

(74) *Attorney, Agent, or Firm* — HAUPTMAN HAM, LLP

(57) ABSTRACT

The control unit of the information processing device acquires the identification information when an accident occurs in the first vehicle leased by the user. Here, the identification information is information including a state of damage caused by an accident of the first vehicle and a percentage of fault of the user in the accident. The control unit of the information processing device performs predetermined processing based on the identification information Here, the predetermined process is a process for determining whether or not to refuse the first application from the user who is an application for leasing the second vehicle in place of the first vehicle during the lease period of the first vehicle, and whether or not to refuse the second application from the user who is an application for leasing the new vehicle after the lease period expires.

6 Claims, 5 Drawing Sheets

USER INFORMATION

| USER ID | VEHICLE ID | FIRST APPLICATION | SECOND APPLICATION |
|---------|------------|-------------------|--------------------|
| *** | *** | YES | YES |
| *** | *** | NO | NO |
| *** | *** | NO | YES |
| ⋮ | ⋮ | ⋮ | ⋮ |

FIG. 6

RESPONSE INFORMATION

| PERCENTAGE OF FAULT | FIRST APPLICATION | SECOND APPLICATION |
|---|---|---|
| *** — *** | YES | YES |
| *** — *** | NO | NO |
| *** — *** | NO | YES |
| ⋮ | ⋮ | ⋮ |

INFORMATION PROCESSING DEVICE, INFORMATION PROCESSING METHOD, AND SYSTEM

CROSS-REFERENCE TO RELATED APPLICATION

This application claims priority to Japanese Patent Application No. 2022-157524 filed on Sep. 30, 2022, incorporated herein by reference in its entirety.

BACKGROUND

1. Technical Field

The present disclosure relates to an information processing device, an information processing method, and a system.

2. Description of Related Art

Japanese Unexamined Patent Application Publication No. 2008-152496 (JP 2008-152496 A) discloses a computer that sets a non-cancelable period during a lease period in a lease contract. An acquisition price, a lease period, a monthly lease fee, and a monthly maintenance and management cost of a leased property related to the lease contract are input to the computer disclosed in JP 2008-152496 A. The computer compares a period in which a fraction is rounded off from a period obtained by multiplying the lease period by a predetermined coefficient stored in advance, and a period in which a fraction is rounded off from a period obtained by multiplying a period obtained by dividing the acquisition price by an amount obtained by subtracting the monthly maintenance and management cost from the monthly lease fee by a predetermined coefficient. As a result, the computer sets any short period as the non-cancelable period.

SUMMARY

An object of the present disclosure is to ensure convenience of a user while suppressing an accident caused by a leased vehicle.

An information processing device according to a first aspect of the present disclosure includes a control unit that executes: acquiring identification information including a condition of a damage caused by an accident of a first vehicle and a percentage of fault of a user to whom the first vehicle is leased in the accident when the accident of the first vehicle leased to the user occurs; and performing a predetermined process to determine whether to decline a first application from the user and whether to decline a second application from the user based on the identification information, the first application being an application for a lease of a second vehicle in place of the first vehicle during a lease period of the first vehicle, and the second application being an application for a lease of a new vehicle after the lease period is expired.

An information processing method according to a second aspect of the present disclosure is an information processing method executed by a computer, and includes: acquiring identification information including a condition of a damage caused by an accident of a first vehicle and a percentage of fault of a user to whom the first vehicle is leased in the accident when the accident of the first vehicle leased to the user occurs; and performing a predetermined process to determine whether to decline a first application from the user and whether to decline a second application from the user based on the identification information, the first application being an application for a lease of a second vehicle in place of the first vehicle during a lease period of the first vehicle, and the second application being an application for a lease of a new vehicle after the lease period is expired.

A system according to a third aspect of the present disclosure is a system including a first information processing device and a second information processing device. The first information processing device transmits, to the second information processing device, identification information including a condition of a damage caused by an accident of a first vehicle and a percentage of fault of a user to whom the first vehicle is leased in the accident when the accident of the first vehicle leased to the user occurs. The second information processing device receives the identification information from the first information processing device, and performs a predetermined process to determine whether to decline a first application from the user and whether to decline a second application from the user based on the identification information, the first application being an application for a lease of a second vehicle in place of the first vehicle during a lease period of the first vehicle, and the second application being an application for a lease of a new vehicle after the lease period is expired.

According to the present disclosure, it is possible to secure convenience of a user while suppressing an accident caused by a leased vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram illustrating an example of a table configuration of correspondence information;

DETAILED DESCRIPTION OF EMBODIMENTS

Figure 1:
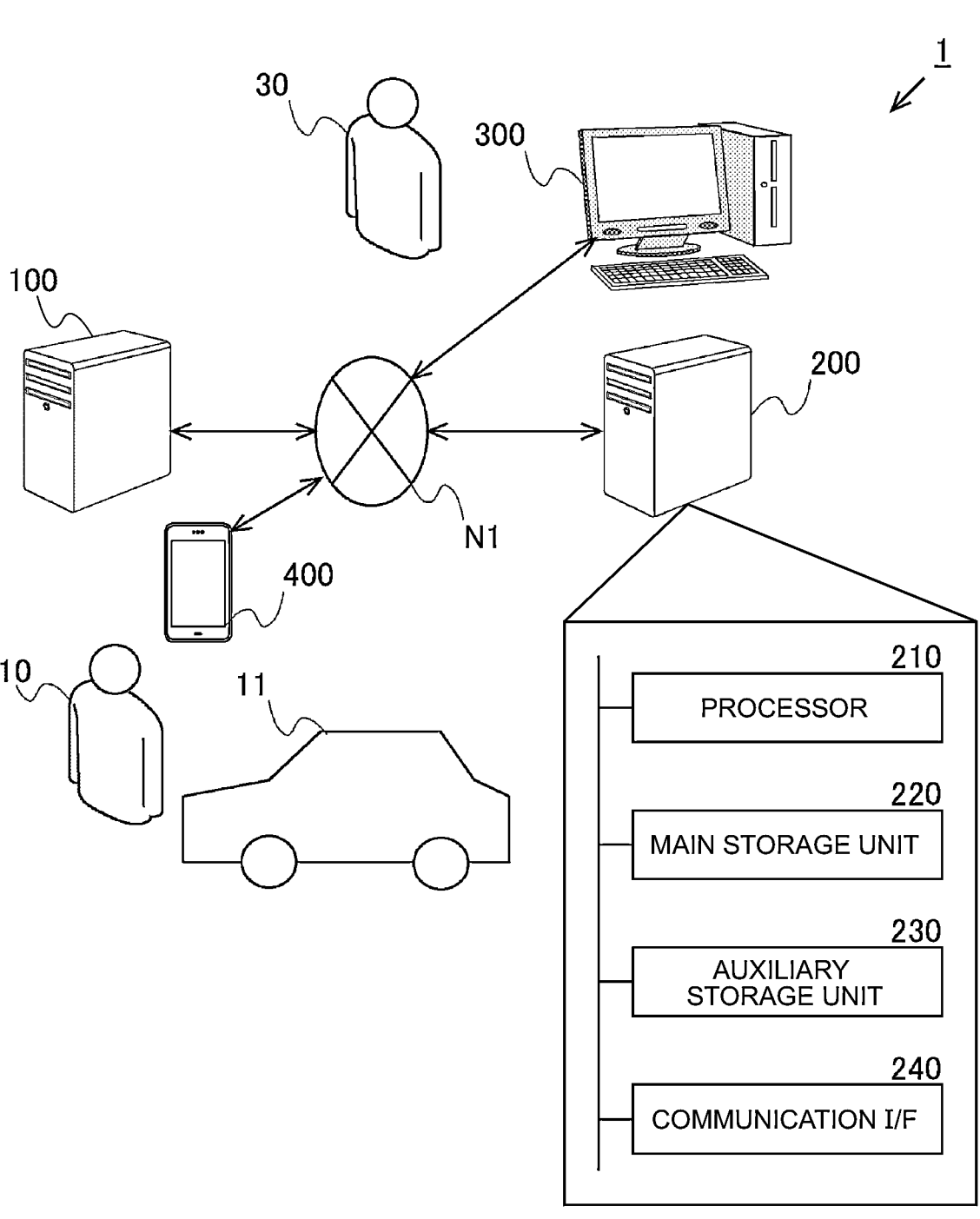
FIG. 1 is a diagram illustrating a schematic configuration of a management system.

Assume that a user has caused an accident due to a vehicle being leased. In this case, the user may desire to lease a new vehicle different from the vehicle that caused the accident. On the other hand, depending on the situation of the accident, it may be inappropriate to lease the vehicle to the user.

For example, it is assumed that a user who has caused an accident in which the leased vehicle is entirely damaged, and in which the percentage of fault of the user is large, has occurred. In this case, the user is a leased vehicle that has caused a serious accident with great negligence. Therefore, the user is unsuitable as a person who receives a vehicle lease. Therefore, it is preferable to make it impossible to make any lease agreement with the user in the future.

On the other hand, it is envisioned that a user who has suffered a minor accident due to damage to a vehicle being leased may attempt to lease a new vehicle to replace the vehicle during a lease contract for the vehicle that has suffered the accident. In this case, since the damage to the vehicle is minimal, the user can use the vehicle that caused the accident. Therefore, it is not preferable for the user to receive a lease of a new vehicle in order to replace the vehicle in which the accident has occurred. However, the accident caused by the user is not a serious accident with great negligence. Therefore, it is not necessary to make it impossible to continue leasing with the user in the future. As described above, it is preferable that the user who has caused an accident in which the vehicle is entirely damaged and the accident in which the percentage of fault is large, and the user who has caused an accident in which the vehicle is damaged with a slight degree of negligence be dealt with differently with the future lease contract.

The control unit of the information processing device according to the first aspect of the present disclosure acquires identification information Here, the identification information is information including a state of damage caused by an accident of the first vehicle (hereinafter, may be simply referred to as a "state of damage"), and a percentage of fault of the user in the accident caused by the first vehicle (hereinafter, may be simply referred to as a "percentage of fault"). The first vehicle is a vehicle in which the user is leased. As a result, the control unit of the information processing device according to the first aspect of the present disclosure can grasp the state of the damage and the percentage of fault based on the identification information Therefore, the control unit of the information processing device performs predetermined processing for determining whether to reject the first application and whether to reject the second application based on the identification information Here, the first application is an application from the user for leasing the second vehicle in place of the first vehicle in the lease period of the first vehicle. The second application is an application for leasing of a new vehicle after the expiration of the lease period of the first vehicle by the user.

As described above, the information processing device determines whether to refuse the first application and the second application based on the state of the damage and the percentage of fault. In this way, it is possible to restrict the application (the first application or the second application) of the lease from the user who caused the accident. Therefore, it is possible to restrict the vehicle from being leased to the user who has caused the accident. As a result, an accident caused by the leased vehicle can be suppressed. In addition, it is determined whether or not to reject the first application and the second application, respectively, according to the state of the damage and the percentage of fault. Therefore, an application for leasing of a vehicle to all users who have caused an accident is not uniformly restricted. As a result, it is possible to ensure convenience when the user receives a vehicle lease. In this way, it is possible to secure the convenience of the user while suppressing an accident caused by the leased vehicle.

Hereinafter, embodiments of the present disclosure will be described below with reference to the drawings. Unless otherwise specified, dimensions, materials, shapes, relative arrangements, and the like of components described in the present embodiments are not intended to limit the technical scope of the present disclosure to those alone.

Embodiment

System Overview

The management system 1 according to the present embodiment will be described with reference to FIG. 1. FIG. 1 is a diagram illustrating a schematic configuration of a management system 1. The management system 1 includes an insurance server 100, a management server 200, a person-in-charge terminal 300, and a user terminal 400. In the management system 1, an insurance server 100, a management server 200, a person-in-charge terminal 300, and a user terminal 400 are connected to each other via a network N1. The network N1 may employ, for example, a Wide Area Network (WAN which is a global public communication network such as the Internet, or a telephone communication network such as a cellular telephone.

Insurance Server

The insurance server 100 is a server that manages automobile insurance of the vehicle 11. The management server 200 is, for example, a server used by an insurance company (hereinafter, sometimes simply referred to as an "insurance company") that handles automobile insurance of the vehicle 11. It is assumed that the user 10 has caused an accident due to the vehicle 11 being leased. In this case, the user 10 contacts the insurance company. Then, the user 10 explains the state of the damage of the vehicle 11 and the state of the accident to the insurance company. Then, the person in charge of the insurance company investigates the accident caused by the user 10, and inputs the state of the damage caused by the accident of the vehicle 11 (hereinafter, sometimes simply referred to as "damage state") to the insurance server 100. At this time, the person in charge of the insurance company inputs the percentage of fault (hereinafter, sometimes simply referred to as "percentage of fault") of the user 10 in the accident to the insurance server 100. In addition, the person in charge of the insurance company inputs the situation of the accident caused by the vehicle 11 to the insurance server 100. The person in charge of the insurance company inputs information on, for example, the situation in which the user 10 has damaged the vehicle 11 to the insurance server 100 as the situation of the accident.

The insurance server generates identification information based on the state of damage to the vehicle 11, the percentage of fault of the user 10, and the situation of an accident caused by the vehicle 11, which are input by the person in charge of the insurance company. Here, the identification information is information including a state of damage of the vehicle 11 and a percentage of fault of the user 10. The identification information is information including a situation of an accident caused by the vehicle 11. The insurance server 100 transmits the identification information to the management server 200 via the network N1.

Management Server

The management server 200 is a server that manages a lease contract of the vehicle 11. The management server 200 is, for example, a server used by a leasing company of the vehicle 11. The management server 200 receives the identification information from the insurance server 100 via the network N1. Thus, the management server 200 can grasp the state of damage to the vehicle 11 and the percentage of fault of the user 10 with respect to the accident caused by the vehicle 11 by the user 10. Here, the state of damage to the vehicle 11 included in the identification information is whether or not it is total loss. The state in which the vehicle 11 is fully lost includes two types of states: a state in which the vehicle 11 is physically fully lost, and a state in which the vehicle 11 is economically fully lost.

Further, the percentage of fault of the user 10 is a percentage representing the percentage of fault of the user 10 in the accident caused by the vehicle 11. For example, if only the user 10 is negligent, the percentage of fault of the user 10 is represented by 100%. Further, for example, in a case where the percentage of fault between the user 10 and the other person is 50:50, the percentage of fault of the user 10 is represented by 50%.

It is assumed that the state of damage of the vehicle 11 is total loss, and the percentage of fault of the user 10 is equal to or greater than a predetermined ratio (100% in the present embodiment). In this case, the user 10 caused a serious accident even though the vehicle 11 is a leased vehicle. Therefore, the user 10 is unsuitable as a person who receives a vehicle lease. Therefore, it is preferable that any lease contract cannot be made with the user 10 in the future.

Further, it is assumed that the state of damage to the vehicle 11 is not a total loss. In this case, since the state of damage to the vehicle 11 is not a total loss, it is possible to use the vehicle 11 in which an accident has occurred. Therefore, it is inappropriate for the user 10 to receive a new vehicle lease in order to replace the vehicle 11. However, the accident caused by the user 10 is an accident that causes the entire loss of the vehicle 11, and is not an accident in which the percentage of fault is 100%. Therefore, it is not necessary to make any lease agreement with the user 10 impossible in the future. As described above, it is preferable that the user 10 deals with the future lease contract differently between the case where the state of damage of the vehicle 11 is total loss and the case where the percentage of fault of the user 10 is 100% of the accident and the case where the state of damage of the vehicle 11 is not total loss.

Therefore, the management server 200 determines whether to reject the first application and whether to reject the second application based on the identification information. Here, the first application is an application for leasing of a new leased vehicle in place of the vehicle 11 during the lease period of the vehicle 11. That is, the first application is an application for exchanging the vehicle 11 during the lease period of the vehicle 11. The second application is an application for leasing of a new vehicle after the expiration of the lease period of the vehicle 11. That is, the second application is an application for concluding a new lease contract after the expiration of the lease contract of the vehicle 11. In this way, a different restriction (refusal of an application) is imposed on an application for leasing of a vehicle between a case where the user 10 has caused an accident in which the vehicle 11 has been entirely damaged and an accident in which the percentage of fault is large, and a case where the user 10 has caused a minor accident in which the vehicle 11 has been damaged. A detailed method of the management server 200 determining whether to reject the first application and whether to reject the second application based on the identification information will be described later.

When the management server 200 receives an application (first application or second application) for leasing a vehicle from the user 10, the management server 200 accepts or rejects the application. A detailed method by which the management server 200 accepts or rejects an application for leasing of a vehicle from the user 10 will be described later.

The management server 200 includes a processor 210, a main storage unit 220, an auxiliary storage unit 230, and a communication interface (including a computer having a communication I/F) 240). The processor 210 is, for example, Central Processing Unit (CPU) or Digital Signal Processor (DSP). The main storage unit 220 is, for example, a Random Access Memory (RAM). The auxiliary storage unit 230 is, for example, a Read Only Memory (ROM). The auxiliary storage unit 230 is, for example, a Hard Disk Drive (HDD, a CD-ROM, DVD disc, or a disc recording medium such as a Blu-ray disc. The auxiliary storage unit 230 may be a removable medium (a portable storage medium). Examples of the removable medium include a USB memory or an SD card. The communication I/F 240 is, for example, a Local Area Network (LAN) interface board or wireless communication circuitry for wireless communication.

In the management server 200, an operating system (OS), various programs, various information tables, and the like are stored in the auxiliary storage unit 230. In the management server 200, the processor 210 loads the program stored in the auxiliary storage unit 230 into the main storage unit 220 and executes the program. As a result, various functions described later can be realized. However, some or all of the functions of the management server 200 may be realized by hardware circuitry such as ASIC or FPGA. Note that the management server 200 does not necessarily have to be realized by a single physical configuration. The management server 200 may be configured by a plurality of computers that cooperate with each other. The insurance server 100 also includes a computer in the same manner as the management server 200.

Contact Terminal

The person-in-charge terminal 300 is a terminal used by the person-in-charge 30. The person in charge 30 is a person in charge of the leasing company of the vehicle 11. The person-in-charge terminal 300 receives the request information from the management server 200 via the network N1. The request information is information for requesting the person in charge 30 of the vehicle 11 to determine whether to reject each of the first application and the second application from the user 10. In the present embodiment, the request information is transmitted from the management server 200 to the person-in-charge terminal 300 in a case where it is preferable to determine whether to individually reject the first application and the second application based on the situation of the accident caused by the vehicle 11 or the like. Based on the request information, the person in charge 30 determines whether to reject each of the first application and the second application from the user 10. The result is reflected in the management server 200. Details of the method by which the management server 200 transmits the request information to the person-in-charge terminal 300 will be described later. Details of a method of causing the management server 200 to reflect the determination result of whether or not the person in charge 30 rejects the first application and the second application from the user 10 will be described later. Note that the person-in-charge terminal 300 includes a computer similarly to the management server 200.

User Terminal

The user terminal 400 is a terminal used by the user 10. The user 10 connects to the management server 200 using the user terminal 400. Then, the user 10 performs the first application or the second application. At this time, the user terminal 400 transmits information indicating that the user 10 has made the first application or the second application (hereinafter, may be referred to as "application information") to the management server 200 via the network N1. Thus, the management server 200 can recognize that the first application or the second application has been made by the user 10. When the management server 200 receives the application information, the management server 200 accepts or rejects the first application or the second application from the user 10.

Functional Configuration

Next, the functional configurations of the insurance server 100 and the management server 200 constituting the management system 1 will be described with reference to FIG.

Figures 2, 3:
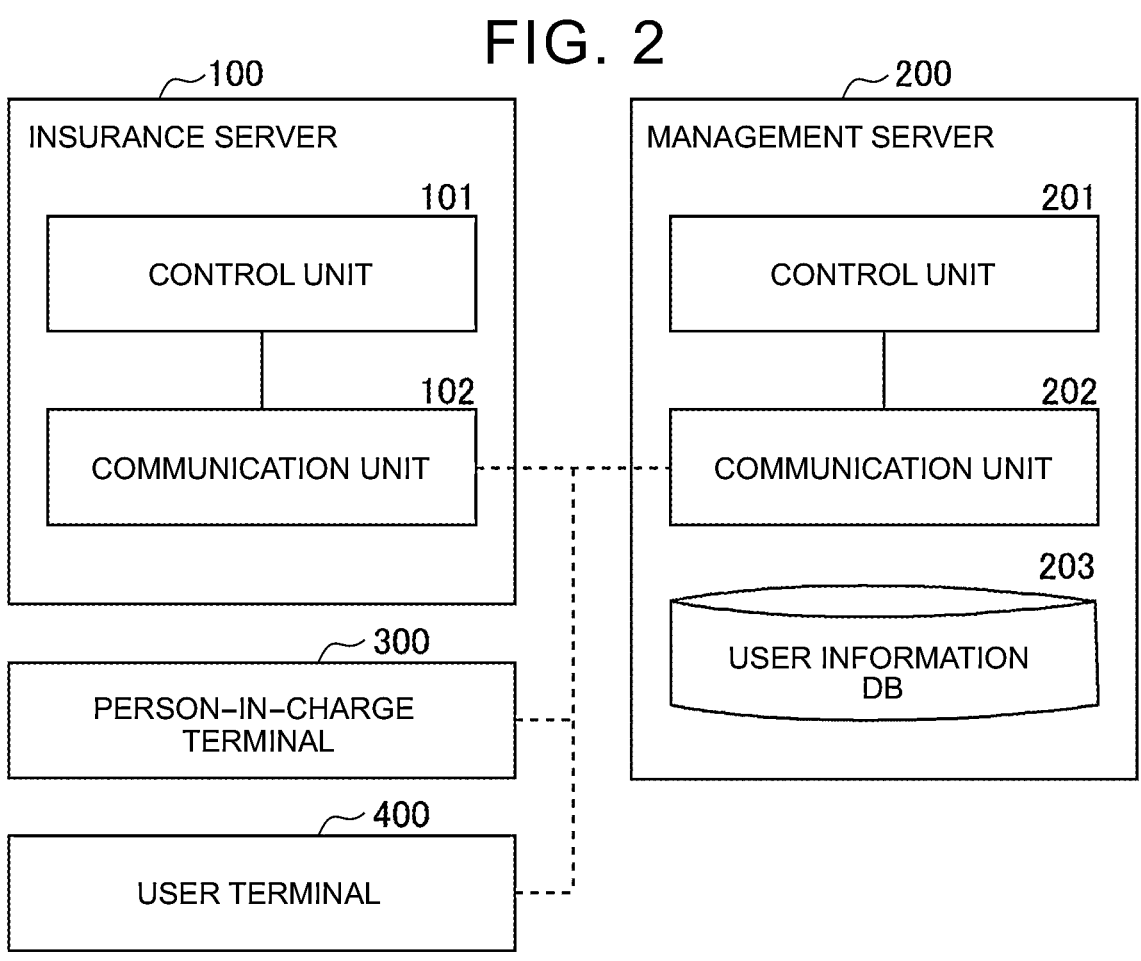
FIG. 2 is a block diagram schematically illustrating an example of a functional configuration of an insurance server and a management server.
FIG. 3 is an example of a table configuration of user information.

2 and FIG. 3. FIG. 2 is a block diagram schematically illustrating an example of a functional configuration of the insurance server 100 and the management server 200.

Insurance Server

The insurance server 100 includes a control unit 101 and a communication unit 102. The control unit 101 has a function of performing arithmetic processing for controlling the insurance server 100. The control unit 101 can be realized by a processor in the insurance server 100. The communication unit 102 has a function of connecting the insurance server 100 to a network N1. The communication unit 102 can be realized by a communication I/F in the insurance-server 100.

The control unit 101 generates the identification information on the basis of the information on the state of the damage of the vehicle 11, the percentage of fault of the user 10, and the situation of the accident caused by the vehicle 11, which is input by the person in charge of the insurance company. The control unit 101 transmits the generated identification information to the management server 200 via the communication unit 102.

Management Server

The management server 200 includes a control unit 201, a communication unit 202, and a user information database 203 (user information DB203). The control unit 201 has a function of performing arithmetic processing for controlling the management server 200. The control unit 201 can be realized by the processor 210 in the management server 200. The communication unit 202 has a function of connecting the management server 200 to a network N1. The communication unit 202 can be realized by a communication I/F 240 in the management server 200.

The user information DB203 has a function of holding user information. The user information is information on whether or not to reject the first application and the second application, respectively, by the user. The user-information DB203 can be realized by the auxiliary storage unit 230 in the management server 200. FIG. 3 is an example of a table configuration of user information.

As illustrated in FIG. 3, the user data includes a user ID field, a vehicle ID field, a first application field, and a second application field. In the user ID field, an identifier (user ID) for specifying a user who is leased by the vehicle is inputted. In the exemplary embodiment shown in FIG. 3, user ID of a plurality of users who are leased by the leasing companies are entered in the user ID field. In the user ID field, the user ID of the user 10 is also inputted. In the vehicle ID field, an identifier (vehicle ID) for identifying the vehicle leased by the user corresponding to the user ID input in the user ID field is input. The vehicle ID of the vehicle 11 is input to the vehicle ID field corresponding to the user ID field input by the user 10.

In the first application field, information about whether or not the first application from the user corresponding to the user ID entered in the user ID field is rejected is input. In the example illustrated in FIG. 3, "Yes" is input when the first application from the user is not rejected. In the example illustrated in FIG. 3, when the first application from the user is rejected, "No" is input.

In the second application field, information about whether or not the second application from the user corresponding to the user ID entered in the user ID field is rejected is input. In the example illustrated in FIG. 3, "Yes" is input when the second application from the user is not rejected. In the example illustrated in FIG. 3, when the second application from the user is rejected, "No" is input.

Here, it is assumed that the user 10 has not caused an accident by the vehicle 11. In this case, "Yes" is input to both the first application field and the second application field in the user information held in the user information DB203. That is, when the user 10 has not caused an accident by the vehicle 11, the first application and the second application from the user 10 are not rejected.

The control unit 201 receives the identification information from the insurance server 100 via the communication unit 202. The control unit 201 executes an update process based on the identification information. The updating process is a process for updating the user information held in the user information DB203.

The control unit 201 acquires the state of damage of the vehicle 11 and the percentage of fault of the user 10 based on the identification information. When the state of damage of the vehicle 11 is total loss and the percentage of fault of the user 10 is 100%, the control unit 201 decides to reject both the first application and the second application from the user 10. In addition, when the state of the damage of the vehicle 11 is not the total loss, the control unit 201 rejects the first application and decides not to reject the second application. Based on the determination result of whether to reject the first application and the determination result of whether to reject the second application, the control unit 201 updates the user information held in the user information DB203.

Specifically, when the control unit 201 decides not to reject the first application in the determination of whether or not to reject the first application from the user 10, the control unit 201 inputs "Yes" in the first application field corresponding to the user ID of the user 10. Further, when the control unit 201 decides to reject the first application in the determination of whether to reject the first application from the user 10, it inputs "No" in the first application field corresponding to the user ID of the user 10.

When the control unit 201 decides not to reject the second application in the determination of whether to reject the second application from the user 10, the control unit 201 inputs "Yes" in the second application field corresponding to the user ID of the user 10. When the control unit 201 decides to reject the second application in determining whether or not to reject the second application from the user 10, the control unit 201 inputs "NO" in the second application field corresponding to the user ID of the user 10.

Further, although the state of damage of the vehicle 11 is total loss, it is assumed that the percentage of fault of the user 10 is not 100%. In this case, it is preferable to determine whether to individually reject the first application and the second application based on the situation of the accident caused by the vehicle 11 or the like. Therefore, the control unit 201 provides the request information to the person in charge 30 of the vehicle 11 based on the identification information. The request information is information including a situation of an accident caused by the vehicle 11, a percentage of fault of the user 10, and the like.

Specifically, the control unit 201 transmits the request information to the person-in-charge terminal 300 via the communication unit 202. Thus, the person in charge 30 determines whether to individually reject the first application and the second application based on the situation of the accident caused by the vehicle 11 or the like. The person in charge 30 directly inputs "Yes" or "No" to the first application field and the second application field in the user information held in the management server 200. When the condition of the damages of the vehicle 11 is total loss but the percentage of fault of the user 10 is not 100%, the user information held in the user information DB203 by the person in charge 30 in this way is updated.

It is assumed that the user 10 makes a first application or a second application to the management server 200. At this time, the control unit 201 receives the application information from the user terminal 400 via the communication unit 202. Thus, the control unit 201 can grasp which of the first application and the second application the user 10 is applying for.

The control unit 201 acquires user information held in the user information DB203. Thus, the control unit 201 can recognize whether or not to reject each of the first application and the second application from the user 10. Then, the control unit 201 determines whether or not to accept the first application from the user 10 according to whether or not "Yes" is input in the first application field corresponding to the user ID of the user 10 in the user information. That is, in the user information, a flag for determining whether or not to accept the first application from the user 10 is stored. Further, the control unit 201 determines whether or not to accept the second application from the user 10 according to whether or not "Yes" is input in the second application field corresponding to the user ID of the user 10 in the user information. That is, in the user information, a flag for determining whether or not to accept the second application from the user 10 is stored.

Update Process

Figure 4:
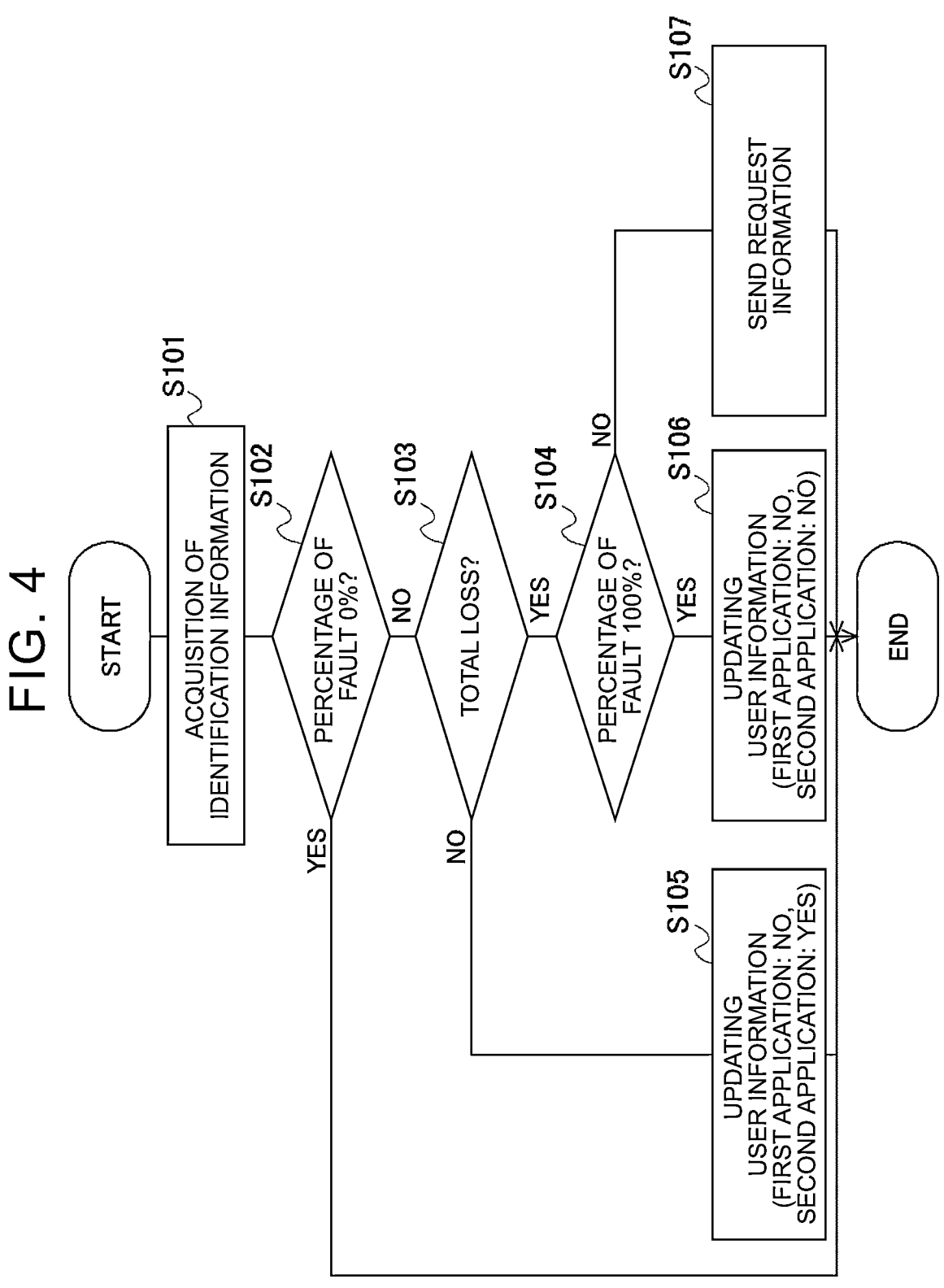
FIG. 4 is a flowchart of an update process.

Next, an update process executed by the control unit 201 in the management server 200 in the management system 1 will be described with reference to FIG. 4. FIG. 4 is a flowchart of the update process. The update process is started when the management server 200 receives the identification information from the insurance server 100.

In the updating process, first, in S101, the identification information is acquired. Thus, the control unit 201 can grasp the state of damage of the vehicle 11 and the percentage of fault of the user 10. Next, in S102, it is determined whether or not the percentage of fault of the user 10 is 0%. If an affirmative determination is made in S102, the percentage of fault of the user 10 is 0%. It is therefore inappropriate to restrict vehicle leasing applications. Therefore, the update process is ended. That is, the updating process is ended while "Yes" is entered in both of the first application field and the second application field in the user information held in the user information DB203. As a result, the first application and the second application from the user 10 remain in a state where they are not rejected.

If a negative determination is made in S102, it is determined whether or not the condition of the damage of the vehicle 11 is total loss in S103. If a negative determination is made in S103, the condition of the damage to the vehicle 11 is not a total loss. Therefore, the user 10 can continue to repair and use the vehicle 11. Therefore, it is inappropriate for the user 10 to receive a new vehicle lease in order to replace the vehicle 11. On the other hand, there is no problem in receiving a new lease after the expiration of the lease period of the vehicle 11.

Therefore, in such a case, the user information held in the user information DB203 is updated in S105. In updating the user information in S105, the control unit 201 inputs "no" in the first application field corresponding to the user ID of the user 10. In updating the user data in S105, the control unit 201 inputs "Yes" in the second application field corresponding to the user ID of the user 10. As a result, the first application from the user 10 is rejected, and the second application from the user 10 is not rejected. That is, the user 10 cannot replace the vehicle 11 during the lease period of the vehicle 11. However, the user 10 can conclude the lease contract after the expiration of the lease contract of the vehicle 11. Then, the update process is ended.

When an affirmative determination is made in S103, it is determined whether or not the percentage of fault of the user 10 is 100% in S104. When an affirmative determination is made in S104, although the vehicle 11 is a leased vehicle, the user 10 caused an accident in which the percentage of fault of causing the entire loss of the vehicle 11 is 100%. Therefore, the user 10 is unsuitable as a person who receives a vehicle lease. Therefore, it is preferable that any lease contract cannot be made with the user 10 in the future.

Therefore, in such a case, the user information held in the user information DB203 is updated in S106. In updating the user information in S106, the control unit 201 inputs "no" in the first application field corresponding to the user ID of the user 10. In updating the user data in S106, the control unit 201 inputs "no" in the second application field corresponding to the user ID of the user 10. As a result, both the first application and the second application from the user 10 are rejected. That is, the user 10 cannot exchange the vehicle 11 during the lease period of the vehicle 11, or conclude a new vehicle lease contract after the lease contract of the vehicle 11 expires. Then, the update process is ended.

When a negative determination is made in S104, it is preferable to individually determine whether to reject each of the first application and the second application from the user 10 on the basis of, for example, the state of an accident caused by the vehicle 11. Therefore, in such a case, the request data is generated in S107 and transmitted to the person-in-charge terminal 300. Then, it is determined by the person in charge 30 whether to reject the first application and the second application from the user 10, respectively. Thereafter, the user information held in the user information DB203 is updated by the person in charge 30. Then, the update process is ended.

Discrimination Process

Figure 5:
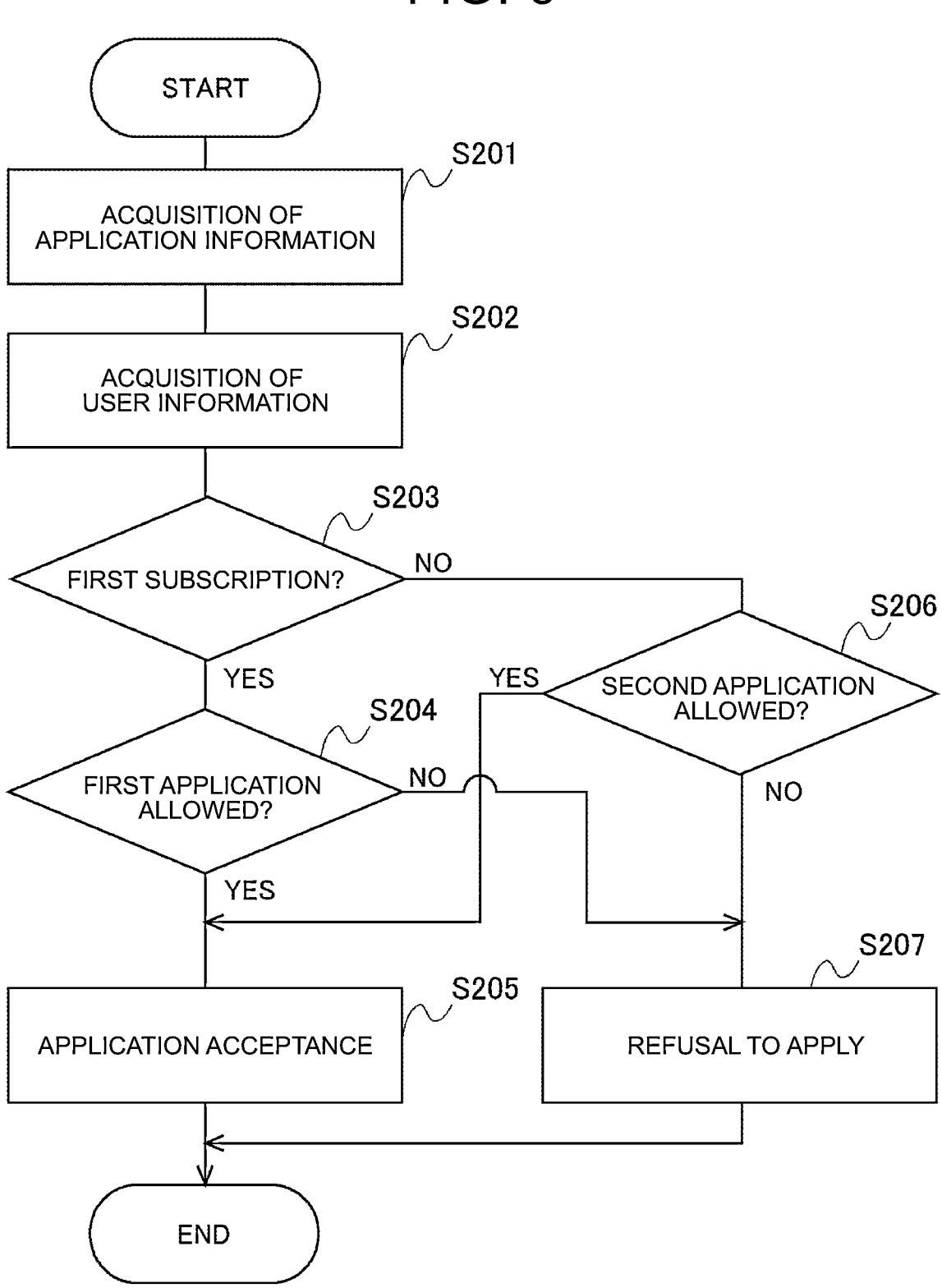
FIG. 5 is a flow chart of a discrimination process.

Next, a determination process executed by the control unit 201 in the management server 200 in the management system 1 will be described with reference to FIG. 5. The determination process is a process for determining whether to accept or reject an application (first application or second application) from the user 10. FIG. 5 is a flowchart of the determination process. The execution of the determination process is started when the management server 200 receives the application information from the user terminal 400.

In the determination process, first, the application data received from the user terminal 400 is acquired in S201. Next, in S202, the user information held in the user information DB203 is acquired. Next, in S203, it is determined whether or not the user 10 has made the first application based on the application data. When an affirmative determination is made in S203, S204 determines whether or not the first application for the user 10 is permitted based on the user data. If it is determined in S204 that the first application is acceptable, the first offer is accepted in S205. Then, the determination process is ended. Also, if it is determined in S204 that the first application is not acceptable, the first application is rejected in S207. Then, the determination process is ended.

When a negative determination is made in S203, the control unit 201 can recognize that the user 10 has made the second application. Therefore, in S206, whether or not the second application for the user 10 is permitted is determined based on the user data. If it is determined in S206 that the second application is acceptable, the second application is accepted in S205. Then, the determination process is ended.

Also, if it is determined in S206 that the second application is not acceptable, the second application is rejected in S207. Then, the determination process is ended.

As described above, it is determined by the management system 1 whether to reject the first application and the second application from the user 10, respectively, based on the state of damage to the vehicle 11 and the percentage of fault of the user 10. As a result, it is possible to restrict the application (the first application or the second application) of the lease from the user 10 who has caused the accident by the vehicle 11. Therefore, it is possible to restrict the vehicle from being leased to the user 10 who has caused the accident. As a result, an accident caused by the leased vehicle can be suppressed. In addition, it is determined whether the first application and the second application are respectively rejected according to the state of the damage of the vehicle 11 and the percentage of fault of the user 10. Therefore, an application for leasing of a vehicle to all users who have caused an accident is not uniformly restricted. As a result, it is possible to ensure convenience when the user 10 receives a vehicle lease. In this way, it is possible to secure the convenience of the user 10 while suppressing an accident caused by the leased vehicle.

First Modification

In the present embodiment, the management server 200 determines whether to reject each of the first application and the second application based on whether or not the percentage of fault of the user 10 is 100%. However, the management server 200 does not necessarily need to determine whether to reject the first application and the second application from the user 10, respectively, based on whether or not the percentage of fault of the user 10 is 100%. For example, the management server 200 may determine whether to reject each of the first application and the second application from the user 10 based on whether or not the percentage of fault of the user 10 is equal to or greater than a predetermined value. Specifically, in S104 process in the updating process illustrated in FIG. 4, the management server 200 determines whether or not the percentage of fault of the user 10 is equal to or greater than a predetermined value, instead of determining whether or not the percentage of fault of the user 10 is 100%. In this case, when it is determined that the percentage of fault of the user 10 is equal to or greater than the predetermined value, S106 process is executed. When it is determined that the percentage of fault of the user 10 is not equal to or greater than the predetermined value, S107 process is executed. Even in this manner, it is possible to secure the convenience of the user 10 while suppressing an accident caused by the leased vehicle.

Second Modification

In the present embodiment, the management server 200 decides whether to refuse the second application based on whether or not the state of damage to the vehicle 11 is total loss. However, the management server 200 does not necessarily have to decide whether to refuse the second application from the user 10 based on whether or not the state of damage to the vehicle 11 is total loss. For example, the management server 200 may determine whether to refuse the second application from the user 10 based on whether or not the amount of damage caused by the damage of the vehicle 11 is equal to or greater than a predetermined value. Here, the predetermined value is also an amount that is uniformly determined, for example. Further, the predetermined value may be, for example, an amount obtained by multiplying the new vehicle price of the vehicle 11 by a predetermined rate. Based on the information about the amount of damage caused by the damage of the vehicle 11 included in the management identification information, the server 200 determines whether or not the amount of damage is equal to or greater than a predetermined value.

Specifically, in S103 process in the updating process illustrated in FIG. 4, the management server 200 determines whether or not the damage amount of the vehicle 11 is equal to or greater than a predetermined value, instead of determining whether or not the damaged state of the vehicle 11 is a total loss. In this case, when it is determined that the damage amount of the vehicle 11 is equal to or larger than the predetermined value, S104 process is executed. When it is determined that the damage amount of the vehicle 11 is not equal to or larger than the predetermined value, S105 process is executed. Even in this manner, it is possible to secure the convenience of the user 10 while suppressing an accident caused by the leased vehicle.

Modification 3

In the present embodiment, when a negative determination is made in S104 process in the updating process, the management server 200 transmits the request information to the person-in-charge terminal 300 in S107. However, in S107, the management server 200 does not necessarily have to transmit the request information to the person-in-charge terminal 300. In S107 process, the management server 200 may determine whether to reject each of the first application and the second application based on the correspondence data stored in the secondary storage unit 330. Here, the correspondence information is information indicating a correspondence between the percentage of fault and whether or not to refuse the first application and the second application. FIG. 6 is a diagram illustrating an example of a table configuration of correspondence information.

As illustrated in FIG. 6, the correspondence information includes a percentage of fault field, a first application field, and a second application field. Note that each piece of information input in the percentage of fault field, the first application field, and the second application field is information input in advance.

In the percentage of fault field, a range of percentage of faults is entered. In the percentage of fault field, for example, a range of a percentage of fault such as 10% or more and less than 20% is input. When the percentage of fault of the user 10 is included in the range of the percentage of fault input in the percentage of fault field, information for determining whether the management server 200 refuses the first application from the user 10 is input to the first application field. In the example illustrated in FIG. 6, "Yes" is input when the management server 200 makes a decision not to reject the first application from the user 10. In the example illustrated in FIG. 6, when the management server 200 makes a decision to reject the first application from the user, "No" is input. When the percentage of fault of the user 10 is included in the range of the percentage of fault entered in the percentage of fault field, information for determining whether or not the management server 200 rejects the second application from the user 10 is input to the second application field. In the example illustrated in FIG. 6, "Yes" is input when the management server 200 makes a decision not to reject the second application from the user 10. In the example illustrated in FIG. 6, when the management server 200 makes a decision to reject the second application from the user, "No" is input.

The management server 200 specifies in which range of the percentage of fault the percentage of fault of the user 10 included in the identification information is input in the percentage of fault field. The management server 200 determines whether to reject the first application and the second application, respectively, based on the correspondence between the percentage of fault field corresponding to the specified percentage of fault range and the first application field and the second application field. Even in this manner, it is possible to secure the convenience of the user 10 while suppressing an accident caused by the leased vehicle.

In the present modification, the correspondence information is information indicating a correspondence between a percentage of fault and whether or not to reject the first application and the second application. However, the correspondence information does not necessarily have to be information indicating a correspondence between the percentage of fault and whether or not to reject the first application and the second application. The correspondence information may be information indicating a correspondence between the situation of the accident caused by the user 10 and whether or not to reject the first application and the second application. In this case, the management server 200 identifies the situation of the accident based on the information about the situation of the accident caused by the vehicle 11 included in the identification information. Then, the management server 200 determines whether to reject the first application and the second application based on the correspondence between the situation of the accident caused by the vehicle 11 by the user 10 and whether to reject the first application and the second application in the correspondence information. Even in this manner, it is possible to secure the convenience of the user 10 while suppressing an accident caused by the leased vehicle.

Other Embodiments

The above-described embodiments are mere examples, and the present disclosure can be implemented with appropriate modifications within a range not departing from the scope thereof. Moreover, the processes and units described in the present disclosure can be freely combined and implemented unless technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Examples of the non-transitory computer-readable storage medium include a random disk (such as a magnetic disk (a floppy disk, an HDD, and the like) or an optical disc (such as a CD-ROM, a DVD disc, and a Blu-ray disc)), a ROM, a RAM, an EPROM, an EEPROM, a magnetic card, a flash memory, an optical card, and a random type of medium suitable for storing electronic instructions.

What is claimed is:

1. An information processing device comprising a control unit that executes:

transmitting a request for information to a terminal device via a wireless network;

acquiring, from the terminal device, identification information including a condition of a damage caused by an accident of a first vehicle and a percentage of fault of a user to whom the first vehicle is leased in the accident when the accident of the first vehicle leased to the user occurs; and performing a predetermined process to determine whether to decline a first application from the user and whether to decline a second application from the user based on the identification information, the first application being an application for a lease of a second vehicle in place of the first vehicle during a lease period of the first vehicle, and the second application being an application for a lease of a new vehicle after the lease period is expired, wherein performing the predetermined process comprises:

determining an amount of the damage to the first vehicle based on the received identification information;

determining the percentage of fault of the user based on the received identification information;

autonomously determining whether to decline at least one of the first application or the second application based on a first comparison of the determined amount of the damage to a first threshold value and a second comparison between the determined percentage of fault of the user and a second threshold value; and autonomously transmitting, to the terminal device, a determination result in response to a decision to decline the at least one of the first application or the second application.

2. The information processing device according to claim 1, wherein the control unit executes, in the predetermined process, determining to decline both the first application and the second application when the condition of the damage is a total loss and the percentage of fault is equal to or more than a predetermined value, and determining to decline the first application and not to decline the second application when the condition of the damage is not a total loss.

3. The information processing device according to claim 1, wherein in the predetermined process, the control unit outputs a notification to request a person in charge who makes a decision as to whether to decline each of the first application and the second application to make the decision when the condition of the damage is a total loss and the percentage of fault is less than a predetermined value.

4. An information processing method executed by a computer, comprising:

transmitting a request for information to a terminal device via a wireless network;

acquiring, from the terminal device, identification information including a condition of a damage caused by an accident of a first vehicle and a percentage of fault of a user to whom the first vehicle is leased in the accident when the accident of the first vehicle leased to the user occurs; and performing a predetermined process to determine whether to decline a first application from the user and whether to decline a second application from the user based on the identification information, the first application being an application for a lease of a second vehicle in place of the first vehicle during a lease period of the first vehicle, and the second application being an application for a lease of a new vehicle after the lease period is expired, wherein performing the predetermined process comprises:

determining an amount of the damage to the first vehicle based on the received identification information;

determining the percentage of fault of the user based on the received identification information;

autonomously determining whether to decline at least one of the first application or the second application based on a first comparison of the determined amount of the damage to a first threshold value and a second comparison between the determined percentage of fault of the user and a second threshold value; and autonomously transmitting, to the terminal device, a determination result in response to a decision to decline the at least one of the first application or the second application.

5. A system including a first information processing device and a second information processing device, wherein:

receiving, from the second information processing device, a request for information to the first information processing device via a wireless network;

the first information processing device transmits, to the second information processing device, identification information including a condition of a damage caused by an accident of a first vehicle and a percentage of fault of a user to whom the first vehicle is leased in the accident when the accident of the first vehicle leased to the user occurs; and the second information processing device executes receiving the identification information from the first information processing device, and performing a predetermined process to determine whether to decline a first application from the user and whether to decline a second application from the user based on the identification information, the first application being an application for a lease of a second vehicle in place of the first vehicle during a lease period of the first vehicle, and the second application being an application for a lease of a new vehicle after the lease period is expired, wherein performing the predetermined process comprises:

determining an amount of the damage to the first vehicle based on the received identification information;

determining the percentage of fault of the user based on the received identification information;

autonomously determining whether to decline at least one of the first application or the second application based on a first comparison of the determined amount of the damage to a first threshold value and a second comparison between the determined percentage of fault of the user and a second threshold value; and autonomously transmitting, to the first information processing device, a determination result in response to a decision to decline the at least one of the first application or the second application.

6. The information processing device according to claim 1, wherein performing the predetermined process further comprises:

determining that the information processing device is not suited to make a determination to decline the at least one of the first application or the second application based on the received identification information; and transmitting a request for decision to the terminal device via the wireless network.

* * * * *